Oct. 29, 1940.  R. R. SAMPSELL  2,219,401
TRAILER
Filed Feb. 23, 1940

Ralph R. Sampsell
INVENTOR,
BY
ATTORNEY.

Patented Oct. 29, 1940

2,219,401

UNITED STATES PATENT OFFICE 2,219,401

TRAILER

Ralph R. Sampsell, Youngstown, Ohio

Application February 23, 1940, Serial No. 320,372

2 Claims. (Cl. 214—84)

This invention relates to a trailer.

The principal object of this invention is the provision of a trailer particularly adapted for use in transporting a boat of relatively small size such as is commonly used in various inland lakes and waterways by various private owners and frequently transported from one lake to another or to the southern part of the country during the winter months when the northernmost lakes are ice bound.

A further object of the invention is the provision of a trailer adapted for carrying a boat and of such a size and shape that it may be conveniently towed behind a conventional automobile without adding undue stress or strain to the automobile.

A still further object of the invention is the provision of a trailer adapted to carry a boat wherein conveniently positioned rollers facilitate the placement of a boat thereon and assist in the easy removal of the boat therefrom.

A still further object of the invention is the provision of a trailer of extremely simple yet sturdy construction, very light in weight and incorporating a readily interchangeable cradle so that the trailer can be readily adapted for use in carrying several different sizes and shapes of boats.

A still further object of the invention is the provision of a trailer adapted to carry a boat and and incorporating independent wheel suspension means whereby each of a pair of ground wheels utilized is independently sprung in relation to the trailer itself.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein.

Figure 1:
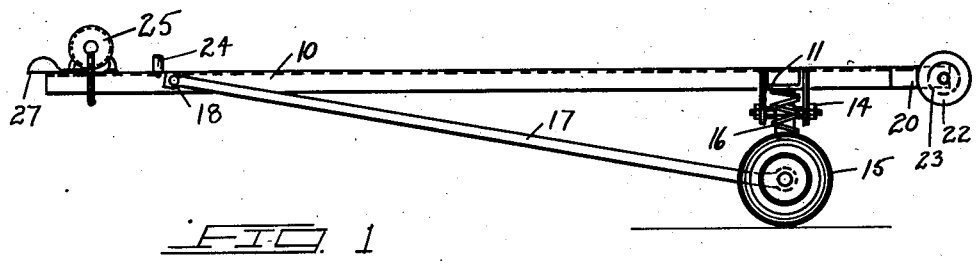
Figure 1 is a side elevation of the trailer.
Figure 2:
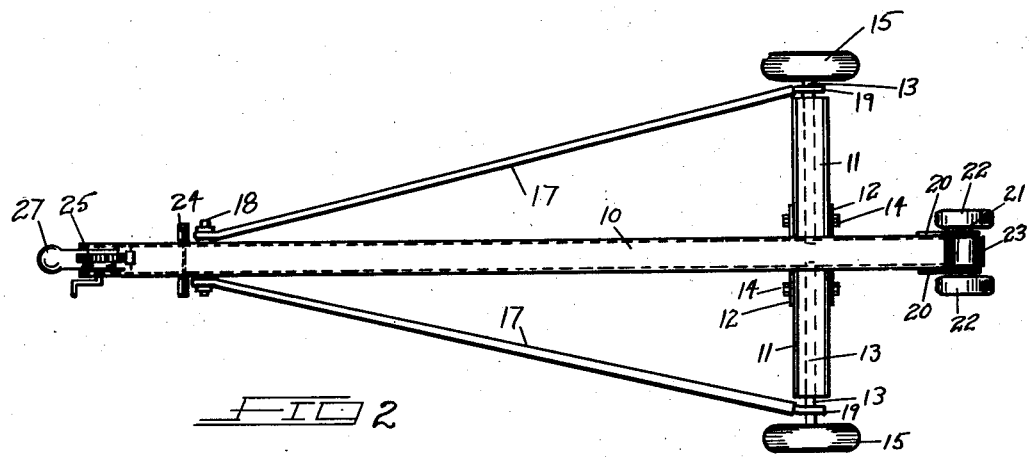
Figure 2 is a top plan view of the trailer.

By referring to the drawing and Figures 1 and 2 in particular it will be seen that the trailer comprises a cross like frame structure preferably formed of channel shaped steel members, the longitudinal one of which is indicated by the numeral 10 and the transversely positioned one of which is indicated by the numeral 11. It will be seen that the longitudinal member 10 is positioned in inverted position so that the arms of the channel shaped member are turned downwardly and the transversely positioned member 11 is positioned with the arms of the channel shaped member in upright position. This construction facilitates the formation of a simple yet sturdy joint where these two members cross. Positioned centrally along both sides of the transverse member 11 and suitably cut out so as to surround the longitudinal member 10 there are a pair of downwardly extending axle brackets 12 (see Figure 3) to which a pair of axle arms 13 are pivoted by means of suitable bolts 14 carrying suitable bushings. These axle arms are formed so that their outermost ends are approximately horizontal and are provided with suitable bearings upon which wheels 15 are carried.

In order that the axle arms may be sprung in relation to the cross like frame of the trailer a pair of coil springs 16 are provided, one of which is positioned between each of the axle arms 13 and a corresponding portion of the transversely positioned frame member 11 immediately thereabove.

In order that the axle arms 13 and the wheels 15 may be positioned correctly in relation to the cross like frame of the trailer, a pair of torque tubes 17 are provided and are pivoted at their foremost end to the longitudinal frame member 11 by means of a pivot 18, the pivot 18 comprising suitable bushings so as to permit the free movement of the torque tubes thereon. The opposite ends of the torque tubes are provided with suitable collars 19 which surround the axle arms 13 at a point adjacent the wheels 15. Suitable bushings or bearings are incorporated at these points.

Figure 3:
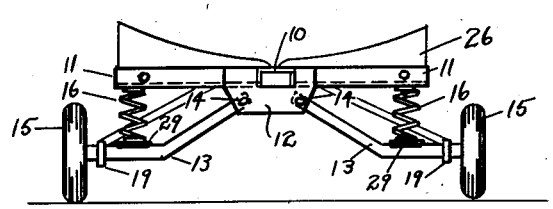
Figure 3 is an end elevation of the trailer showing in addition a boat carrying cradle positioned thereon.

By referring again to Figure 2 of the drawing it will be seen that a rearwardly extending portion of the longitudinal frame member 11 has been provided with a pair of extension arms 20 which arms carry a short axle shaft 21 upon which the outermost ends of which are positioned a pair of rubber covered rollers 22 and carries, between the arms 20, a single rubber covered roller 23 of smaller diameter than the rollers 22. By referring to the forward end of the longitudinal frame member 11 it will be seen that a pair of rubber covered rollers 24 are positioned thereon in V like relation thereto. These rollers 24 as well as the rollers 22 and 23 are adapted to receive and convey keel portions of a boat placed on the trailer. It is obvious that the positioning of the rollers 22 and 23 make the loading of a boat on the trailer much simpler than would otherwise be the case as it is only necessary to place the bow of the boat on the rollers 22 and 23 and pull the boat forward thereon by means of a winch 25 positioned on the front end of the trailer frame. In order that the boat may be firmly positioned on the trailer it is obvious that a cradle of the approximate shape of the bottom of the boat is necessary and a cradle 26 is shown in Figure 3 of the drawing. The cradle 26 is preferably formed of wood and is positioned between the upturned arms of the transversely positioned frame member 11 and bolted thereto. The cradle 26 may be readily removed and replaced with a cradle of different shape when desired by simply unbolting it and removing it from its position in the channel like transverse portion 11 of the frame of the trailer. Still referring to the forwardmost end of the trailer frame, it will be seen that a conventional trailer hitch 27 is attached thereto so that the trailer may be conveniently towed by an automobile or other vehicle.

Figure 4:
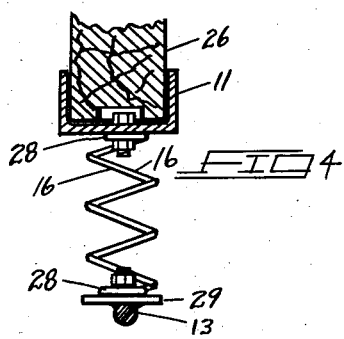
Figure 4 is an enlarged detail view with parts in cross section showing a section of the transverse portion of the trailer frame end and the spring means thereof.

By referring to Figure 4 of the drawing an enlarged cross sectional detail view of the spring means is shown wherein the coil spring 16 is shown provided with eyes 28 at its opposite ends which are adapted to be bolted to the transverse portion 11 of the frame and to a plate 29 welded to the axle arm 13. A section of the cradle 26 is shown positioned between the upturned arms of the transverse section 11 of the trailer frame.

It will thus be seen that a simple and efficient boat trailer has been disclosed that may be formed economically from a relatively few parts and which will very efficiently handle boats of various sizes. The boat trailer, due to its unique construction, is unusually limber due to its relatively small proportion of unsprung weight.

What I claim is:

1. A trailer comprising a cross like frame formed of a longitudinal and transverse member, the said frame members formed of channel shaped material, the said channel shape inverted in the said longitudinal member and positioned upright in the said transverse member, a pair of axle brackets formed on the said transverse member and depending therefrom, a pair of axle arms pivoted between the said axle brackets and a pair of coil springs positioned between the said axle arms and the said transverse member, the said axle arms adapted to carry wheels on their outermost ends, together with a pair of torque tubes pivotally mounted on the said longitudinal frame member and on the said axle arms, a plurality of rollers positioned at the rearmost end of the said longitudinal member and a cradle adapted to receive and retain a boat positioned in the said transverse member.

2. A trailer comprising a cross like frame formed of a longitudinal and transverse member, the said frame members formed of channel shaped material, the said channel shape inverted in the said longitudinal member and positioned upright in the said transverse member, a pair of axle brackets formed on the said transverse member and depending therefrom, a pair of coil springs positioned between the said axle arms and the said transverse member, the said axle arms adapted to carry wheels on their outermost ends, together with a pair of torque tubes pivotally mounted on the said longitudinal frame member and on the said axle arms, a plurality of rollers positioned at the rearmost end of the said longitudinal member and a crade adapted to receive and retain a boat positioned in the said transverse member, together with a winch positioned on the forwardmost end of the said longitudinal member and a pair of rollers adjacent thereto.

RALPH R. SAMPSELL.